F. SPENCER.
PROCESS OF MARBLEIZING CEMENT.
APPLICATION FILED MAR. 31, 1916.

1,204,378.

Patented Nov. 7, 1916.

Witnesses
Louis R. Stabler
C. C. Hines

Inventor
Frank Spencer,
By Victor J. Evans
Attorney

UNITED STATES PATENT OFFICE.

FRANK SPENCER, OF LOUISVILLE, KENTUCKY.

PROCESS OF MARBLEIZING CEMENT.

1,204,378. Specification of Letters Patent. Patented Nov. 7, 1916.

Application filed March 31, 1916. Serial No. 88,097.

*To all whom it may concern:*

Be it known that I, FRANK SPENCER, a citizen of the United States, residing at Louisville, in the county of Jefferson and State of Kentucky, have invented new and useful Improvements in Processes of Marbleizing Cement, of which the following is a specification.

This invention relates to a process of marbleizing cement, contemplating particularly the production of building blocks, slabs and other articles made from cement and having the surface finished in appearance of plain or veined natural marble, the object of the invention being to provide a simple, efficient and inexpensive method of making imitation marble articles of this character.

A further object of the invention is to provide, in a process of the character described, a novel step of manufacture, whereby the plastic material may be given an appearance simulating closely the hardness and solidity and smoothness of texture of solid marble.

Figure 1:
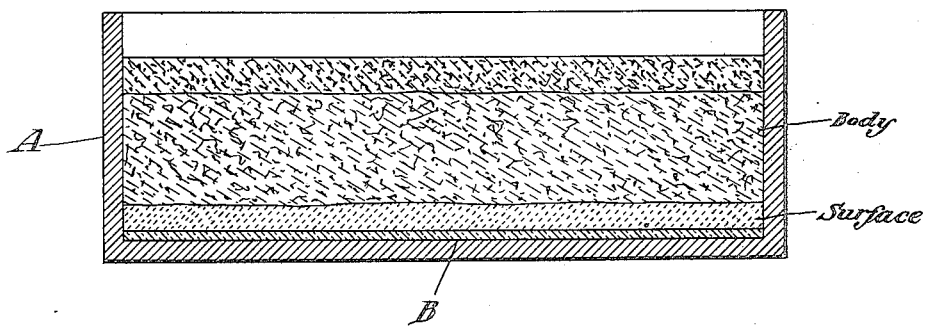
Figure 2:
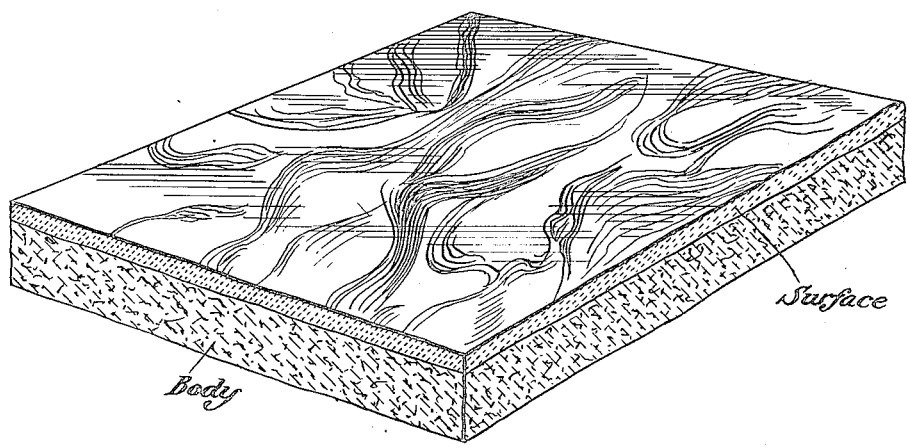

In the accompanying drawing illustrating the invention:—Figure 1 is a sectional view through a mold or form, showing a block or other article in the process of manufacture. Fig. 2 is a sectional view through the completed block, illustrating conventionally the composition thereof.

In the following description I have set forth particularly a method of producing artificial marble articles from cement which includes the steps of coloring for the purpose of making colored or veined marble, but it is to be understood that the invention is not restricted in this respect, as it is applicable to the production of plain as well as colored or veined marbles, the invention being especially directed to a proces of producing a surface finish of a hard and polished character similar to natural marble.

In carrying my invention into practice for the production of colored or veined marbleized or marble-surfaced building blocks, slabs or like articles, I first prepare a suitable coloring compound or mixture consisting of white Portland cement, a mineral coloring material, such as burnt umber, sienna, cobalt, or ultramarine blue, and water, the ingredients being combined preferably in the proportions of one part of the desired mineral coloring matter to one or more parts of the cement and a sufficient amount of water to make a mixture of cream-like consistency, the ingredients being thoroughly stirred or otherwise commingled together. I then make a layer or surface mixture of white Portland cement and water to form the surface of the block or other article to be produced, which surface may be approximately one-quarter of an inch thick, and with this mixture is combined the previously prepared coloring compound above described. These two mixtures are then thoroughly incorporated by stirring, preferably with paddles, until streaks of the size and character simulating a particular grade or kind of marble are produced. In the manufacture of white or plain marble articles, a surface mixture of plain cement and water, together with a proper amount of a suitable coloring agent to give the proper tint, will be employed. The surface layer material thus made, which is of the consistency of thick cream, is then poured into a mold or other former having a bottom face-forming surface of a smooth, polished character, such as glass or polished metal, the mold or former being of the required size to produce a block or other article of the prescribed dimensions. Preliminarily to the pouring in of the cream-like surface material the face-forming surface of metal or glass is prepared for a combined smoothening and hardening action by coating it with a hardening or condensing solution containing oxalic acid, such solution being formed by dissolving oxalic acid in water, one ounce of the acid being commonly employed to two gallons of water. In pouring in the surface composition used in making veined or colored marble care is taken to pour the same so as to properly distribute the coloring matter to give the predetermined kind of veins or streaks.

Immediately after pouring in the surface composition, and while it is still in a fluid state, I subject the material in any suitable manner to a process of jarring or vibration, preferably by a hammering action on a suitable portion of the form or mold. By this jarring or vibrating action the solid particles of material in the mass are caused to gravitate and come together, thus filling up all voids and forcing the moisture to the surface and making the material dense or compact so as to promote and increase the efficiency of the hardening and smoothing or polishing action of the oxalic acid solution. The molded material may be used in this form after having been allowed to set and harden, but in the production of a building block or other like article the mold is filled up to the top, after the operations previously described, with a composition of a desired character to form the body or back portion of the block. This composition preferably consists of a plastic mixture of common sand and cement combined in equal proportions, and a suitable quantity of water, making a cream-like mixture which is poured into the mold on top of the surface layer produced in the manner hereinbefore described. The article thus far made is then allowed to stand for a period of about two hours to permit the particles to settle, and the top or back surface thereof is then covered with wet sand, and the article allowed to remain in the mold for a further period of twenty-four hours, during which the particles of the material take a permanent set or a certain degree of concretion of the mass occurs.

By the process of preparing the surface layer or face portion of the block it will be understood that the particles of cement are caused, by gravity and the vibration set up, to settle downward so that the heaviest particles will come to the surface and into contact with the polished plate of glass or metal and the oxalic acid solution thereon. As a result, the settling of the particles will effect a displacement of the moisture and the filling of all voids and the bringing to the surface of the heavy particles and their settlement in contact with the polished forming surface to secure a maximum degree of density and surface smoothness. During this action of the settlement of the particles the oxalic acid acts to render all free lime contained in the mixture insoluble, and as this action is promoted by the bringing of the heavy particles to the surface it will be understood that the surface composition will be hardened to a very high degree and concretion of the mass promoted and hastened. The result of this method of treatment is that within a comparatively short time the material is rendered as hard and durable as natural marble and with a surface finish like marble in appearance and having a high degree of smoothness and polish. The block with the polished face-forming surface may then be removed from the mold and allowed to finally set or harden to give the requisite solidity and durability to the body of backing, or the block allowed to remain in the mold for a further period of about seventy-two hours during which time it is immersed in a hardening and condensing solution of oxalic acid and water prepared as previously described, which solution acts upon the still plastic material to harden the body to a desired degree. In removing the block it is stripped from the face-forming surface, and prior to use, whatever its previous mode of treatment as above described, may be allowed to dry or cure in the open air for a further period.

By subjecting the cement to the surface of a weak solution of oxalic acid an artificial marble of a great degree of hardness, closeness of texture and durability is produced which simulates in these respects to a very high degree the qualities of the natural article. By this method of manufacture and by varying the colors as desired or required, blocks or other articles simulating the different grades or species of plain or colored natural marble may be efficiently produced. While the step of treating the block to an oxalic acid solution is of material value and importance in the manufacture of articles of this character, it will, of course, be understood that such step may be generally employed in the production of plastic articles which are to resemble marble or the like or to have a desired degree of density and closeness of texture. By such method of surface treatment, instead of making the oxalic acid solution a component part of the cement mixture, I avoid the objection of continuing the hardening process throughout the mass, which causes progressive and premature concretion tending to make the material brittle and inclined to fracture, whereas by simply hardening the surface to a predetermined depth the body of the material is allowed to harden naturally, so that the artificially hardened surface layer will be backed by a more resilient or elastic body materially increasing its resistance to fracture.

I claim:—

1. The process of producing an article having a polished and hard-surfaced finish closely simulating marble from plastic material having Portland cement as its base, which consists in molding the article in face contact with a polished surface coated with a solution containing oxalic acid.

2. The process of producing an article having a polished and hard-surfaced finish closely simulating marble from plastic material having Portland cement as its base, which consists in molding the article in face contact with a polished surface coated with a solution containing oxalic acid, and vibrating the material during a predetermined portion of its period of formation.

3. The herein described process of manufacturing articles from plastic material having Portland cement as its base, which consists in providing a mold having a face forming surface, coating said surface with a solution containing oxalic acid, shaping the plastic material in said mold to the desired form and against said surface, allowing the plastic material to stand and settle, then covering the same with a backing, and then removing the article thus formed.

In testimony whereof I affix my signature in presence of two witnesses.

FRANK SPENCER.

Witnesses:
 CHAS. DALTON,
 H. McDONALD.